Patented Nov. 21, 1944

2,363,300

UNITED STATES PATENT OFFICE 2,363,300

PRODUCTION OF MOTOR FUEL

Albert Ernest Dunstan, London, and Stanley Francis Birch, Sunbury-on-Thames, England, assignors, by mesne assignments, to Anglo-Iranian Oil Company Limited, London, England No Drawing. Application July 27, 1937, Serial No. 155,918. In Great Britain July 29, 1936

21 Claims. (Cl. 260—683.4)

This invention relates to the production of a high class motor fuel adapted for use as an aviation or motor spirit constituent of high antiknock rating and consisting essentially if not entirely of iso-paraffins.

According to the invention an olefine is subjected to contact with an iso-paraffin (that is a paraffin containing a tertiary carbon atom) in the presence of a mineral acid, whereby on settlement an upper hydrocarbon layer separates which is composed substantially of saturated hydrocarbons boiling within the motor spirit range from which a fully saturated aviation or motor spirit or constituent may be produced on distillation. The reaction may be carried out without the necessary use of high pressure. Thus iso-paraffins such as isobutane and isopentane and olefines such as propylene, isobutene, diisobutene and triisobutene or mixtures of such paraffins or of such olefines may be used, and the conditions of operation are advantageously such that the liquid phase is maintained during the period of contact. Furthermore, the iso-paraffins may be employed in admixture with normal paraffins which are incapable of entering into the reaction. The olefine too may be admixed with inert material. As a general rule, however, it is preferable to utilise both reactants in as pure a state as possible, since there is a tendency for the yield to be poorer and difficulties may possibly be encountered in separating the non-reactive material from the product.

According to the invention moreover the iso-paraffin or iso-paraffins may advantageously be used in substantial or considerable excess of equimolecular proportions with respect to the olefine or olefines used.

The invention comprises the process carried out under the conditions hereinafter described and the products thereof.

It is known to treat with sulphuric acid at low temperatures hydrocarbon fractions containing olefines that also contain iso-paraffins, but in such hydrocarbon fractions the content of the iso-paraffins is low, and this is the case in hydrocarbon fractions that contain lower olefines such as iso- and normal butenes suitable for use according to the invention for the production of saturated iso-paraffin derivatives boiling in the motor spirit range.

Where however equimolecular proportions of iso-butane or iso-pentane and the selected olefines react (or equivalent proportions when the polymerides of iso-butene are used) it is necessary that substantial amounts of the iso-paraffins indicated should be made available and advantageously also isolated, in order that it may be possible for the saturated iso-paraffin derivatives to be produced according to the invention on a practical or industrial scale and under conditions of practical convenience and economy.

In carrying the invention into effect an olefine such as diisobutene is added to a mixture of an iso-paraffin such as isobutane in the presence of a mineral acid such as sulphuric acid (approximately 97 per cent), the mixture being thoroughly stirred. It is advisable that the olefine should be added gradually to the mixture while the stirring proceeds. The diisobutene is added in a ratio of one molecular proportion of diisobutene to two molecular proportions of isobutane, the isobutane being advantageously present in substantial excess of this proportion. It is advisable that the olefines should be added gradually to the mixture while the stirring proceeds. The temperature employed may ordinarily be about 0° C. In the case of isobutane however the temperature of the reaction is determined by the boiling point of the iso-paraffin which is −10.2° C. If therefore the reaction be carried out under pressure the temperature of the reaction may be higher whereby the liquid phase is maintained during the reaction. Stirring of the mixture is continued for a short period after all the olefine has been added, whereupon the mixture is allowed to settle and the lower acid layer withdrawn on settlement, apparently little changed except in respect of colour. The clear colourless upper hydrocarbon layer after settlement is soda-washed and distilled. It is found to be almost entirely saturated, the olefine having apparently completely reacted. Some of the original iso-paraffin is recovered and can be re-processed. When normal paraffins are present in the feed stock they too will be recovered unchanged. They should preferably be separated from the recovered unchanged iso-paraffin before re-processing the latter. The residual material has a pleasant odour and is almost entirely iso-paraffinic in composition.

In carrying out the reaction advantageously, it is desirable to employ a volume ratio of total hydrocarbon to sulphuric acid initially of between about 1.5:1 and about 2.0:1 with a calculated ratio after all of the olefin has been added of between about 2.5:1 and about 4.4:1. These ratios will be apparent from an inspection of the following examples wherein the volume ratios employed are shown to fall within these ranges. For practical purposes the ratios may be determined by computing upon the basis of volumes of isoparaffins, olefins and sulfuric acid actually employed, although it is realized that the final volumetric ratio when computed on the amount of hydrocarbon to sulfuric acid employed is not strictly accurate at the conclusion of the alkylation reaction since some olefinic reactant remains absorbed in the acid and the alkylate produced together with the unreacted hydrocarbons may possess a slightly decreased volume with respect to the initial total volumes of the reacted reactants added to the sulfuric acid. However, the ratios do provide an indication of the relative amounts of both types of reactants as well as sulfuric acid which are admixed in order to form the reaction mixture.

The novel features of volume ratio of total hydrocarbon to sulfuric acid initially and finally maintained in the alkylation reaction are more fully set forth and claimed in co-pending divisional application Serial No. 379,442, filed February 18, 1941.

The following are a number of examples of the carrying out of the process of production of motor fuel according to the invention under a variety of conditions and in the use of various olefines and iso-paraffins.

EXAMPLE 1

Four hundred cc. of concentrated commercial sulphuric acid (approximately 97 per cent) are charged with 400 grams (about 667 cc.) of liquid isobutane at −12° C. into a vessel fitted with an efficient stirrer and surrounded by a bath of cooling liquid maintained at −10° C. to −12° C. 400 grams (about 533 cc.) of diisobutene are slowly run into the mixture over a period of two hours and stirring is continued for a further period of 30 minutes after the addition of diisobutene. The volume ratio of total hydrocarbon to acid was about 1.67:1 initially and was about 3:1 or somewhat lower after all the diisobutylene had been added. The mixture is allowed to settle and the lower acid layer is run off. The acid layer is straw coloured and has increased in volume by about 15 cc. The upper hydrocarbon layer is soda-washed and distilled. It boils over a comparatively wide range, and contains a considerable quantity of unreacted isobutane, the fraction 50–150° C. representing 48 per cent of the total hydrocarbon charge. The portion boiling between 90° and 110° C. has an octane number of 95.5 (C. F. R. motor method).

The C. F. R. motor method of determining knock-rating is described in "The Principles of Motor Fuel Preparation and Application" by Nash and Howes, vol. II, paragraph 759.

EXAMPLE 2

Four hundred cc. of concentrated commercial sulphuric acid (approximately 97 per cent) are thoroughly mixed with 600 cc. isopentane in a vessel surrounded by ice and fitted with a stirrer. Four hundred cc. diisobutene are added gradually over a period of two hours. The initial volume ratio of total hydrocarbon to acid was about 1.5:1. The final ratio was about 2.5:1 or actually slightly lower due to the condensation reaction. Stirring is continued for a further period of 30 minutes after the diisobutene has been added. At the end of this time the mixture is allowed to settle and the lower acid layer is removed. The recovered acid is straw coloured and has a volume of 415 cc. approximately. The upper layer of treated hydrocarbon is soda-washed and distilled. It distils over a wide range and contains a proportion of isopentane which has not reacted. The fraction boiling from 50–175° C. represented 52% of the total hydrocarbon charge and is practically completely saturated. It has an octane number of 84 (C. F. R. motor method).

EXAMPLE 3

Six hundred cc. of isopentane and 400 cc. of sulphuric acid (approximately 97 per cent) were placed in a vessel cooled in ice and the mixture vigorously stirred. When thoroughly cold 400 cc. of diisobutene were slowly added over a period of 2 hours, after which stirring was continued for a further half hour. The hydrocarbon to acid volume ratios were maintained within the ranges set forth in Example 2. The reaction product was then allowed to settle and the upper colourless hydrocarbon layer withdrawn. The acid which was a pale straw colour increased in volume in the treatment by 5–15 cc., while the volume of the hydrocarbon layer after neutralisation was approximately 875 cc., its specific gravity was .713 at 60° F., and its bromine number (Francis method) 4. The Francis method of determining bromine number is described in "The Principles of Motor Fuel Preparation and Application" by Nash and Howes, vol. II, paragraph 573. After removal by distillation of unchanged isopentane the specific gravity was .731 at 60° F., and 84 per cent boiled between 50 and 200° C. leaving a residue having a specific gravity of .789 at 60° F., and bromine number (Francis) 27. The product was fully saturated and essentially iso-paraffinic in composition. The yield of the hydrocarbon boiling above 50° C. represented 176 per cent of the olefine taken. The material produced had a high anti-knock rating and was produced without the application of heat and without pressure.

EXAMPLE 4

A polymer gasoline produced by the catalytic polymerisation of olefines and having a boiling range of 80–120° C. was used as the olefinic material, having a specific gravity of .727 at 60° F., and a bromine number (Francis) of approximately 200. The treatment was carried out as in Example No. 3 using 400 cc. acid (97 per cent), 440 grams (about 730 cc.) of isobutane and 440 grams (about 587 cc.) of the polymer gasoline. The polymer gasoline was slowly added in a period of 1¾ hours, the stirring being continued for a further ¾ hour. The recovered acid was rather darker in colour than that recovered in Example No. 3, and had increased in volume to 450 cc. The amounts of reactants and acid correspond to an initial hydrocarbon to acid volume ratio of about 1.82:1 and a final ratio of about 3.29:1. The hydrocarbon layer after the removal of isobutane had a specific gravity of .728 at 60° F., and bromine number (Francis) 31. Fractionation yielded a product boiling over a wide range, 74 per cent boiling to 200° C., having a specific gravity of .715 at 60° F., bromine number (Francis) 21.5 and a residue having a specific gravity of .801 and bromine number (Francis) 57. The distillate boiling to 200° C. had a pleasant odour and an octane number 84.6 (C. F. R. motor method). With an addition of ethyl fluid equivalent to .2 cc. tetra ethyl lead per (Imp.) gal. the octane number was raised to 95.5.

It may be noted that while the bromine number of the fractionated reaction product was high, the bromine number of the polymer gasoline was very high, and that modification of conditions would have resulted in an even lower bromine number of the fractionated product.

EXAMPLE 5

Sixteen hundred cc. of sulphuric acid (97 per cent) were placed in a pressure vessel provided with a stirrer and an external jacket through which cold or warm kerosene or the equivalent could be circulated, and 1800 grams (about 3210 cc.) of isobutane were added. The acid and paraffin were then stirred with warm kerosene circulating through the jacket, until the temperature of the mixture reached 20° C., the pressure reaching 45 lb. per sq. inch (gauge), when 1800 grams (about 2490 cc.) of diisobutene were slowly added with vigorous stirring. Cooled kerosene was circulated through the jacket during this addition to remove the heat evolved, so maintaining the temperature of the mixture at about 20° C. The addition required 1½ hours, after which stirring was continued for a further ½ hour. The pressure had then fallen to about 10–15 lb. per sq. inch (gauge). The hydrocarbon to acid ratios were initially 2:1 and finally about 3.56:1.

To facilitate handling, the product was then cooled down to 0° C., the acid and hydrocarbon layers separated, and the hydrocarbon layer completely neutralized with soda. The results of the treatment in the use of diisobutene as olefinic material and isobutane as the paraffin are recorded below in run No. 2 of Table No. 1, together with the results of similar runs when using triisobutene under the same conditions (runs 3 and 4—Table No. 1).

Similar results are obtained when operating at +30° C. although there is a little more SO₂ formation than at the lower temperature. The acid however retains the same appearance.

By operating at −10° C. a somewhat lower yield of useful product, that is a fraction having a boiling range of 27°–185° C. is obtained, but this possesses a slightly higher octane rating (runs 1 and 3—Table No. 1). The efficiency of the agitation is an important factor, the product improving with increasing efficiency of agitation.

The acid in these runs is not spent and may be used repeatedly or employed for other refining operations.

Isobutene may be used instead of or together with diisobutene or triisobutene or other such olefines or mixtures of diisobutene and triisobutene may be used.

Thus in carrying out the process, gases from a cracking plant in which a petroleum stock is subjected to a cracking distillation may first be treated in known manner with sulphuric acid (60 per cent) followed by heating and polymerisation whereby there is produced a mixture of diisobutene and triisobutene in addition to a proportion of unchanged material. The diisobutene and triisobutene may be subject to contact with an iso-paraffin in the presence of sulphuric acid as hereinbefore described.

Alternatively the mixture of diisobutene and triisobutene may be fractionated and the diisobutene may be hydrogenated by known means to produce an isooctane of 100 octane number, and the triisobutene may be subject to contact with an iso-paraffin in the presence of sulphuric acid as hereinbefore described for the production of a saturated spirit of high anto-knock value having an octane number of about 89 to 90. From the product of the reaction of isobutane and isobutene or polyisobutenes, iso-octane, (2.2.4 trimethylpentane) may be separated by fractionation. Among other hydrocarbons which may be isolated by fractionation are: 2-methylbutane (isopentane), 2.3 dimethylbutane, 2.3- and 2.4-dimethylpentane and 2.2.5 trimethylhexane.

TABLE No. 1

Tabulated examples of treatments carried out according to the invention in which the following olefines, viz:
(i) diisobutene, (ii) triisobutene and (iii) propylene were used with isobutane, in each case in the following proportion Sulphuric acid (approximately 97% except in run No. 5 in which the acid strength was 100.6%) ... cc.. 1600
Isobutane ... g.. 1800
Olefine (i) or (ii) ... g.. 1800
Olefine (iii) ... g.. 1300

| Run No. | Olefine | Temp., °C. | Per cent product >27° C. on olefine taken | Boiling range of product: 27–185° C. | | | | | | Residue >185° | | |
| --- | --- | --- | --- | --- | --- | --- | --- | --- | --- | --- | --- | --- |
| | | | | Per cent on olefine taken | Bromine No. | S. G./60° F. | Engine test | | | Per cent on olefine taken | Bromine No. | S. G./60° F. |
| | | | | | | | 50% in H. O. S.[1] | Neat | +1½ cc. tetraethyl lead per (imp.) gal. | | | |
| 1 | (i) | −10 | 152 | 106 | <1 | .709 | 72.9 | 92.1 | 105 | 36.4 | 22 | .786 |
| 2 | (i) | +20 | 158 | 133 | <1 | .710 | 70.5 | 89.3 | 99.7 | 20 | 13.5 | .781 |
| 3 | (ii) | −10 | 152 | 106 | <1 | .710 | 71.2 | 88.8 | 100.6 | 38.1 | 33 | .792 |
| 4 | (ii) | +20 | 163 | 138 | <1 | .704 | 68.9 | 88.7 | 98.9 | 20.5 | 13 | .782 |
| 5 | (iii) | 25–30 | 150 | 122 | <1 | .698 | 67.4 | 82.5 | 93.3 | 23.0 | 2.5 | .776 |

[1] Basic blending material, 52.5 octane number.

TABLE No. 2

A. S. T. M. (American Standard Test Method) distillations of the products of runs 2, 4 and 5 referred to in Table No. 1

| | Run 2 | Run 4 | Run 5 |
| --- | --- | --- | --- |
| Initial boiling point, °C | 43 | 32 | 43.5 |
| 2% | 64 | 44 | 59.5 |
| 5% | 77.5 | 55 | 69 |
| 10% | 90 | 69 | 80 |
| 20% | 102 | 93.5 | 90 |
| 30% | 110 | 105 | 96 |
| 40% | 115.5 | 111 | 101.5 |
| 50% | 120.5 | 122 | 109 |
| 60% | 129 | 131 | 122 |
| 70% | 140 | 143.5 | 145.4 |
| 80% | 162 | 167 | 169.5 |
| 90% | 196.5 | 198 | 200 |
| Final boiling point | 257 | 244 | 248 |
| Total distillate, percent | 98 | 98 | 97.5 |
| Residue | 1 | 1 | 1 |
| Loss | 1 | 1 | 1.5 |
| Vol. to 70° C., percent | 3 | 10.5 | 5.5 |
| 100° | 19 | 25 | 36.5 |
| 140° | 70 | 67 | 67 |

In run No. 5 of Table No. 1 the reaction between isobutane and propylene was conducted in the same way as with isobutane and diisobutene. Propylene was added as liquid under pressure and sulphuric acid containing 2.5% free sulphur trioxide (equivalent to 100.6% sulphuric acid) was used. At the end of the reaction the pressure fell practically to that of the atmosphere on cooling the vessel to 0° C.

Inasmuch as when using propylene, a small amount of dialkyl sulphate is present in the hydrocarbon layer, neutralisation should be thoroughly carried out (as for example by stirring with 10 per cent soda for 5 hours) to prevent the formation of free acid and acid products with consequent charring of the contents of the still during the subsequent distillation.

The product from this reaction contains considerable quantities of 2.3- and 2.4-dimethylpentanes.

EXAMPLE 6

In the foregoing examples the proportion of the isoparaffin to olefine is approximately such that for each molecule of the former one molecule of the latter or its equivalent in the case of polymerides is taken. Since the polymerides so far examined behave as though depolymerised to the monomeric form before reaction, the quantity of iso-paraffin required is determined by the monomeric equivalent of the polymer, e. g. two molecular proportions of iso-butane to one of diisobutene, three molecular proportions of isobutane to one of triisobutene and so on. The proportions indicated in the foregoing examples are not however essential. On the contrary substantial or considerable excess of the iso-paraffin or iso-paraffins is generally advantageous in point of overall yield of the product, high proportion of useful material in the product and the lower boiling range of the small residue obtained. These advantages were demonstrated in the results recorded in the following Table No. 3 which were obtained with diisobutene and isobutane in the weight ratios of 1:1, 1:2 and 1:4. The results recorded in Table No. 3 indicate that a substantial or considerable excess of iso-butane favours the formation of the octane fraction which in the third experiment recorded was large. The proportion of useful product is much higher than when equimolecular proportions of isobutane and olefine are used. The yield of 2.2.4 trimethylpentane recoverable by distillation is also increased considerably. An engine test on the total product from that experiment after removal only of excess iso-butane gave an octane rating of 90.6 octane number, and with an addition of ethyl fluid equivalent to 1.5 cc. of tetra ethyl lead per gallon (Imp.) rose to 100 octane number. Similar results were obtained in the use of triisobutene in place of the dimeride. On the other hand the use of isobutane in substantial or considerable excess offers relatively little disadvantage since it can be easily recovered by distillation and re-used.

By "substantial or considerable excess" is meant a substantially greater excess of isobutane than that small excess required to ensure against the momentary presence in the vigorously stirred reaction mixture of a local excess of the olefine as it is slowly added and admixed with isobutane or isopentane and sulphuric acid during the period of contact, which substantially greater excess may reach a considerable proportion with the practcial advantages referred to.

TABLE No. 3

Tabulated results of three experiments carried out according to the invention in which the isobutane:diisobutene ratios by weight were respectively 1:1, 2:1, and 4:1.

Diisobutene and isobutane at 20° C. using 96.9 per cent acid.
Pressure used sufficient to maintain the isobutane in the liquid phase.
Time of addition: 90 min. Time of stirring: 30 min.
Expt. No. 1.—1:1 3000 cc. isobutane  Expt. No. 2.—2:1 4500 cc. isobutane  Expt. No. 3.—4:1 6000 cc. isobutane
 1800 g. diisobutene   1350 g. diisobutene   900 g. diisobutene

| Isobutane:diisobutene ratio | Volume acid taken | Product >27° C. | | | | | | | | | | | | | | | | | Product 27–185° C. | | | Engine test | | | Residue | | |
|---|---|---|---|---|---|---|---|---|---|---|---|---|---|---|---|---|---|---|---|---|---|---|---|---|---|---|---|
| | | Per cent on olefine taken | I. B. P., °C. | A. S. T. M. distillation | | | | | | | | | | | F. B. P., °C. | Per cent T. D. | Per cent res. | Per cent on olefine taken | Bromine No. | Sp. gr. at 15.6° C. | 50% in H. O. S. | Neat | Neat+1.5 cc. TEL | Per cent on olefine taken | Bromine No. | Sp. gr. at 15.6° C. |
| | | | | 2% | 5% | 10% | 20% | 30% | 40% | 50% | 60% | 70% | 80% | 90% | | | | | | | | | | | | |
| 1:1 | 1,600 | 165 | 38 | 45.5 | 53 | 66.5 | 94 | 105 | 112.5 | 117.5 | 125.5 | 137.5 | 160.5 | 197 | 257 | 97.5 | 1.5 | 136 | <1 | .705 | 71.2 | 90.5 | 98 | 22 | 14 | .783 |
| 2:1 | 1,200 | 184 | 33 | 39 | 49 | 64 | 89 | 101 | 107 | 112 | 118.5 | 128 | 148 | 194 | 230 | 96.5 | 1 | 158 | <1 | .700 | 71.1 | 91.3 | 98.9 | 14.8 | 9.5 | .782 |
| 4:1 | 800 | 190 | 36.5 | 55 | 68 | 81 | 96.5 | 103 | 107 | 110.5 | 114.5 | 120 | 133.5 | 172 | 220 | 97.5 | 1.5 | 167 | <1 | .705 | 72.3 | 92.2 | 101 | 10.8 | 10 | .777 |

EXAMPLE 7

To 3000 cc. isobutane and 1600 cc. of sulphuric acid (97 per cent) were added while maintaining the temperature at 20° C., 2250 cc. of liquid butene-2 during a period of 1½ hours and sufficient pressure was applied to maintain the liquid phase. After agitating for a further ½ hour, the product was separated and worked up as in previous examples. The initial volume ratio of hydrocarbon to acid was about 1.87:1, while the final ratio was about 3.28:1. The overall yield of product based upon the olefine taken was 164 per cent, the specific gravity of the product .706 at 60° F. and the bromine number (Francis) 3. On distillation the yield of the fraction having the boiling range 27–185° C. was equivalent to 148 per cent of the olefine taken. This fraction had a specific gravity of .706 at 60° F., bromine number (Francis) less than 1, and an octane rating of 90.2, octane number increasing to 100.3 octane number on addition of ethyl fluid equivalent to 1.5 cc. tetra ethyl lead per gallon (Imp.). The distillation range of the product was substantially the same as that obtained when diisobutene is used under similar conditions. Fractionation indicated the presence of appreciable quantities of iso-octane (2.2.4 trimethylpentane) in this product.

EXAMPLE 8

The olefine employed consisted in a fraction having a boiling range of 105–112° C. taken from the product formed by the condensation of n-butene and isobutene in the C4 cut from gas derived from an oil cracking plant, when using a phosphoric acid catalyst. The material in question consisted largely of the condensation product from one molecule each of n-butene and isobutene, being essentially a 2.2.3, trimethylpentene, and is hereinafter referred to as butene-isobutene polymer.

To a mixture of 1600 cc. sulphuric acid (97 per cent) and 3000 cc. of isobutane were added 1800 g. (about 2430 cc.) of butene-isobutene polymer over a period of 90 minutes maintaining the temperature steady at 20° C. against the heat of condensation, the pressure being sufficient to maintain the liquid phase. Finally, after a further 30 minutes agitation, the product was separated from the acid and worked up as in previous examples. The initial hydrocarbon to acid ratio was about 1.87:1 with a final ratio of about 3.4:1. The yield of the crude product of specific gravity .713 at 60° F., and bromine number (Francis) 2, was equivalent to 158 per cent yield based upon the olefine taken. On distillation the yield of the fraction having a boiling range of 27–185° C. was equivalent to 135% of the olefine taken. This fraction had a specific gravity .707 at 60° F., bromine number (Francis) less than 1 and an octane rating of 87, the octane number increasing to 97.9 with addition of ethyl fluid equivalent to 1.5 cc. tetra ethyl lead per gallon (Imp.).

The product obtained from a crude butene-isobutene polymer, a fraction of boiling range 95–120° C. which also contained a small amount of diisobutene gave practically the same yield, but the octane rating of the product was 88.7 octane number, and 99.2 octane number with addition of 1.5 cc. tetra ethyl lead per gallon (Imp.).

EXAMPLE 9

To 2000 cc. isobutane and 1070 cc. of sulphuric acid (97 per cent) were added while maintaining the temperature at 20° C. and stirring vigorously, 2700 cc. of a crude C4 fraction cut from cracking gas and containing 94% of C4 unsaturated hydrocarbons, the pressure used being sufficient to maintain the reactants in the liquid phase. Addition was carried out over a period of 90 minutes followed by a further 30 minutes agitation. The initial hydrocarbon to acid volume ratio was about 1.87:1 with the final ratio being about 4.4:1. The crude product after a thorough neutralisation with caustic soda was redistilled and yielded a fraction boiling 27–185° C. with a gravity of .706/60° F. and bromine number (Francis) of 1. Tested on the engine the neat product gave by the C. F. R. motor method 91.6 octane number rising to 99.5 octane number with the addition of ethyl fluid corresponding to 1.5 cc. tetraethyl lead per (Imp.) gal.

It will be understood that the process may be advantageously carried out continuously, and that instead of sulphuric acid being used phosphoric acid may be used alone or with sulphuric acid in the process.

We claim:

1. A process for the production of high antiknock motor fuel hydrocarbons, which comprises polymerizing isomeric butylenes to di-butylenes and then reacting the di-butylenes with iso-butane to form octanes.

2. A process for the production of iso-octane which comprises polymerizing iso-butylene to di-isobutylene and then reacting the di-isobutylene with iso-butane to form iso-octane.

3. A process for the production of iso-octanes, which comprises reacting isomeric di-butylenes with iso-butane in the presence of sulphuric acid to form iso-octanes.

4. A process for the production of iso-octane, which comprises reacting di-isobutylene with isobutane in the presence of sulphuric acid to form iso-octane.

5. A process for the manufacture of iso-octanes, which comprises subjecting a hydrocarbon fraction containing isobutylene and isomeric normal butenes to cross polymerization in the presence of a selective polymerization catalyst whereby mixed di-isobutylenes are formed and alkylating isobutane with said di-isobutylenes in the presence of an alkylation catalyst to form iso-octanes.

6. A process for the manufacture of iso-octanes, which comprises subjecting a hydrocarbon fraction comprising essentially a C4 fraction of cracked hydrocarbons to selective polymerization in the presence of a polymerizaton catalyst whereby di-isobutylenes are selectively produced and reacting the di-isobutylenes with iso-butane in the presence of an alkylation catalyst comprising sulphuric acid to produce iso-octanes.

7. A process for the production of a motor fuel comprising alkylating an isoparaffin with an olefin reactant comprising essentially a reactive lower boiling polymer of isobutene in the presence of sulfuric acid of high concentration at a temperature between about −10° C. and about +30° C. while vigorously stirring the reaction mixture during the period of contact, contacting the reaction mixture under alkylation reaction conditions for sufficient period of tume to effect the substantial production of saturated isoparaffinic hydrocarbons, allowing the reacted mixture to settle, separating normally liquid isoparaffinic hydrocarbons from the supernatant layer and recovering the desired product from this layer.

8. A process for the production of a motor fuel comprising alkylating an isoparaffin with an olefin reactant comprising essentially a reactive lower boiling polymer of C4 olefin in the presence of sulfuric acid of high concentration at a temperature between about −10° C. and about +30° C. wherein the olefin reactant is slowly run into a preformed admixture containing the isoparaffin and sulfuric acid with vigorous agitation, and maintaining the reaction mixture under alkylation reaction conditions for sufficient length of time to effect the production of substantial amounts of normally liquid isoparaffin hydrocarbons, allowing the reaction mixture to settle, separating the alkylate products from the supernatant layer and recovering the desired products therefrom.

9. A process as in claim 7 wherein at least sufficient superatmospheric pressure is employed to maintain liquid phase operation.

10. A process as in claim 8 wherein at least sufficient superatmospheric pressure is employed to maintain liquid phase operation.

11. A process for the manufacture of normally liquid hydrocarbons boiling within the gasoline boiling range which comprises reacting low boiling polymers resulting from the polymerization of C4 olefins with an isoparaffin selected from the group consisting of isobutane and isopentane in the presence of concentrated sulfuric acid catalyst under alkylation reaction conditions.

12. A process for the production of branched chain, paraffinic hydrocarbons boiling within the motor fuel range which comprises reacting normally liquid olefinic polymers of normally gaseous olefine with at least one iso-paraffin in the presence of concentrated sulfuric acid of alkylating strength at a temperature of between about −10° C. and about +30° C. for sufficient length of time to effect substantial alkylation of the isoparaffinic component with the polymeric component and recovering from the reacted mixture normally liquid, branched chain paraffinic hydrocarbons boiling within the motor fuel range.

13. A process as in claim 12 wherein the reaction is carried out continuously, in liquid phase and with intensive agitation of the reaction mixture.

14. A process as in claim 12 wherein the reaction is carried out in the liquid phase with intensive agitation and wherein the isoparaffinic component comprises essentially isopentane.

15. A process as in claim 12 wherein the reaction is carried out in the liquid phase with intensive agitation and wherein the isoparaffinic component comprises essentially isobutane.

16. A process as in claim 12 wherein the isoparaffinic component is first admixed with the concentrated sulfuric acid and the olefinic polymer component is slowly added thereto while intensively agitating the mixture in a liquid phase operation.

17. A process for the production of motor fuel constituents comprising essentially branched chain saturated hydrocarbons boiling within the motor fuel range which comprises reacting a normally liquid polymer of a normally gaseous monoolefin with at least one isoparaffin in the presence of concentrated sulfuric acid of alkylating strength under alkylation reaction conditions.

18. A process as in claim 17 wherein the reaction is carried out under at least sufficient superatmospheric pressure to maintain liquid phase operation and wherein the reaction mixture is vigorously agitated.

19. A process as in claim 17 wherein the olefin is added gradually with agitation in a liquid phase operation to a preadmixture of isoparaffin and sulfuric acid maintained at an initial volume ratio of between about 1.5:1 and about 2.0:1.

20. A process as in claim 17 wherein the olefin is added gradually with agitation in a liquid phase operation to a preadmixture of isoparaffin and sulfuric acid maintained at an initial volume ratio of between about 1.5:1 and about 2:1 prior to the addition of olefin and wherein the olefin is added in sufficient quantity to give a final total hydrocarbon to acid ratio computed on a basis of original volumes of isoparaffin and acid of between about 2.5:1 and about 4.4:1.

21. A process as in claim 17 wherein the olefin is added gradually with agitation in a liquid phase operation to a preadmixture of isoparaffin and sulfuric acid maintained at an initial volume ratio of between about 1.5:1 and about 2:1 prior to the addition of olefin and wherein the olefin is added in sufficient quantity to give a final total hydrocarbon to acid ratio computed on a basis of original volumes of isoparaffin and acid of between about 2.5:1 and about 4.4:1 and wherein the sulfuric acid has a concentration of between about 97% and about 100%.

ALBERT ERNEST DUNSTAN.
STANLEY FRANCIS BIRCH.